(12) United States Patent
Yokota (10) Patent No.: US 6,406,056 B2
(45) Date of Patent: Jun. 18, 2002

(54) AIR BAG DEVICE FOR PASSENGER'S SEAT

(75) Inventor: Keishi Yokota, Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 09/797,915

(22) Filed: Mar. 5, 2001

(30) Foreign Application Priority Data

Mar. 9, 2000 (JP) ........................................ 2000-065345

(51) Int. Cl.⁷ .............................................. B60R 21/16
(52) U.S. Cl. ................................... 280/728.2; 280/732
(58) Field of Search ..................... 280/728.1, 728.2, 280/732, 728.3

(56) References Cited

U.S. PATENT DOCUMENTS

| | | | | |
|---|---|---|---|---|
| 5,482,313 A | * | 1/1996 | Ikeya et al. ............... | 280/728.2 |
| 5,851,023 A | * | 12/1998 | Nagata et al. ............ | 280/728.3 |
| 5,857,696 A | * | 1/1999 | Inoue et al. .............. | 280/728.2 |
| 6,161,865 A | * | 12/2000 | Rose et al. ............... | 280/728.3 |
| 6,193,269 B1 | * | 2/2001 | Amamori ................. | 280/728.2 |

FOREIGN PATENT DOCUMENTS

| | | | | |
|---|---|---|---|---|
| JP | 05065048 A | * | 3/1993 | ............... 280/728.2 |
| JP | 7-117609 | | 5/1995 | |
| JP | 2528375 | | 6/1996 | |
| JP | 11-321513 | | 11/1999 | |

* cited by examiner

Primary Examiner—Brian L. Johnson
Assistant Examiner—Faye M. Fleming
(74) Attorney, Agent, or Firm—Kanesaka & Takeuchi

(57) ABSTRACT

An air bag is fixed to a base plate, and a lid is integrally formed in an instrument panel. A frame portion of the lid has hook holes therein. An assembly including the folded air bag is installed to the instrument panel by engaging the hooks with the hook holes. In the air bag device, all or most of components can be used in common in various models with different layout requirements of the space behind instrument panel.

9 Claims, 13 Drawing Sheets

Fig. 17

AIR BAG DEVICE FOR PASSENGER'S SEAT

BACKGROUND OF THE INVENTION AND RELATED ART STATEMENT

The present invention relates to an air bag device for protecting a front seat passenger in a vehicle.

In a conventional air bag device for protecting a front seat passenger, an air bag is accommodated in a container-like retainer in a folded state and the front opening of the retainer is covered with a lid. An inflator (gas generator) for inflating the air bag is disposed at the bottom of the retainer. The lid is formed of a covering member separate from an instrument panel or formed of a certain area of the instrument panel defined by tear lines.

The conventional air bag device for protecting the front seat passenger includes the container-like retainer, and it is, therefore, necessary to design the retainer to have specific shape and size so as to meet the layout requirements (size and shape) of a space behind the instrument panel.

The object of the present invention is to provide an air bag device, in which all or most of the components can be used in common in various vehicle models with different layout requirements of the space behind the instrument panel.

SUMMARY OF THE INVENTION

An air bag device of the present invention comprises an air bag in a folded state, a base plate to which the air bag is fixed, and an inflator fixed to the base plate, wherein the base plate is arranged only behind the air bag.

Further, an air bag device of the present invention comprises an air bag in a folded state, a base plate to which the air bag is fixed, and an inflator fixed to the base plate. The front of the air bag is covered by an instrument panel, and the instrument panel has tear lines which allow the deployment of the air bag into a vehicle cabin when the air bag is inflated with gas spouted out from the inflator and thus presses the back of the instrument panel, wherein the base plate is arranged only behind the air bag.

In the air bag device for protecting the front seat passenger, the base plate which is arranged only behind the air bag is used instead of the conventional container-like retainer. The air bag device can be installed in various vehicles in case only air bag-fixing portions are made similar, regardless of the profile or configuration of the instrument panel.

When the front of the air bag of the device for the passenger's seat is covered by the instrument panel, the instrument panel has tear lines formed in a portion in front of the air bag and can open just like a door because of rupture of the tear lines.

According to one embodiment of the present invention, a frame portion integrally formed in the instrument panel surrounds the periphery of the air bag. In this case, the frame portion may be long to surround the entire periphery of the air bag, or may be short to surround just a portion of the periphery of the air bag near the instrument panel.

According to the present invention, a surrounding member for surrounding the periphery of the air bag, which is provided separately from the base plate or from the instrument panel may be attached to the base plate.

This surrounding member which has a shape and a size meeting the layout requirements of the space behind the instrument panel may be employed. That is, the base plate can be common to most of the models of the vehicles if only the surrounding member is designed to correspond to the model. In this manner, the air bag device for the passenger's seat can be installed in most of the models of the vehicles.

The surrounding member may be movable relative to the base plate in the depth direction, thereby more effectively absorbing impact on the instrument panel when an occupant collides with the instrument panel. In this case, the surrounding member may be supported on the base plate by a resin member, and the resin member may be compressed by the surrounding member and thus plastically deformed when the surrounding member moves relative to the base plate in the depth direction. This structure achieves further more effective absorption of impact on the instrument panel.

The surrounding member may be hooked to the instrument panel. For example, when a relatively short frame portion is disposed on the instrument panel, hooks provided on the surrounding member are engaged with hook holes formed in the frame portion.

DETAILED DESCRIPTION OF PREFERRED EMBODIMENTS

Figure 1:
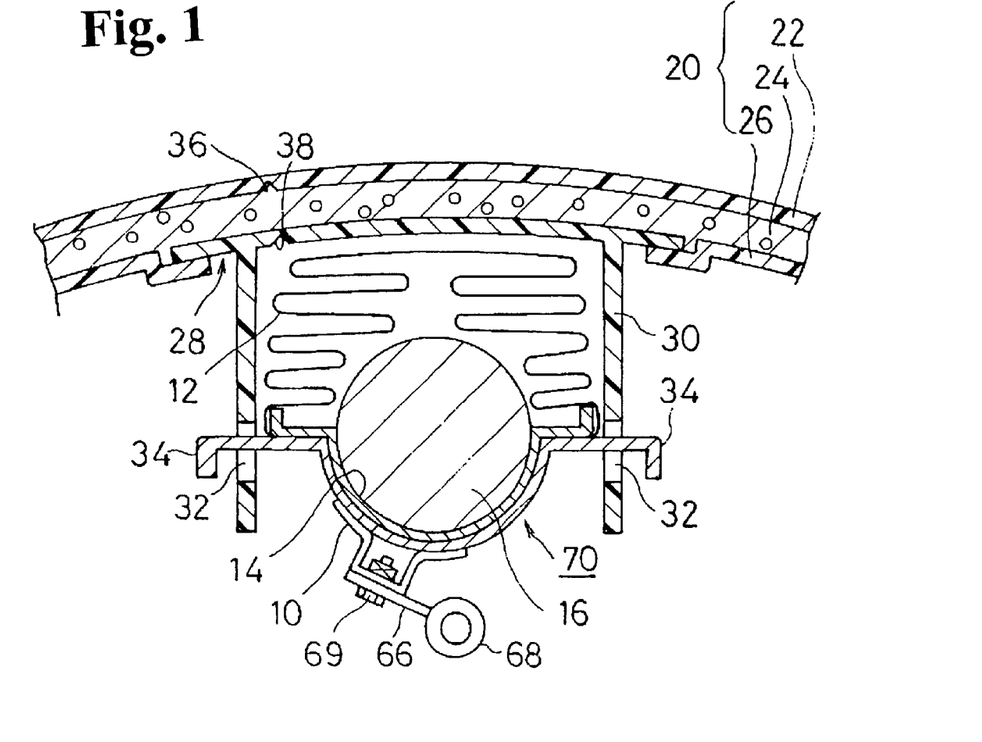
FIG. 1 is a vertical sectional view of an air bag device according to an embodiment.
Figure 2:
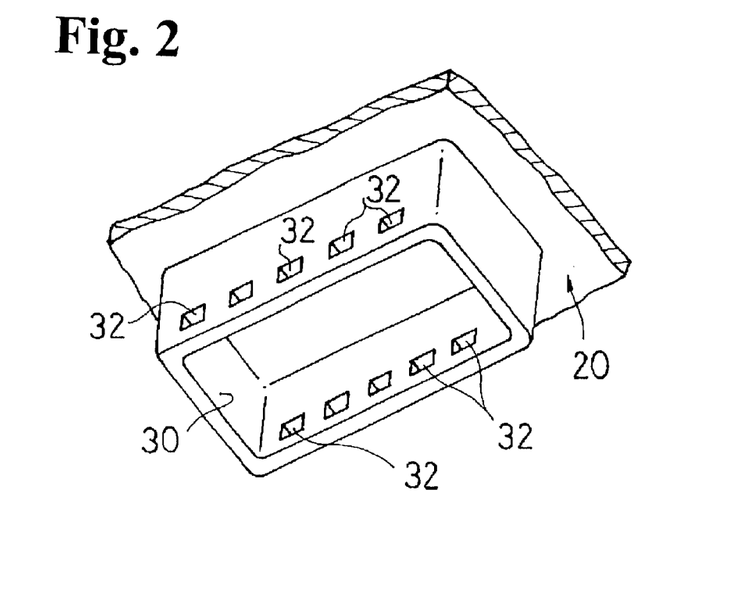
FIG. 2 is a perspective view showing the structure behind an instrument panel.
Figure 4:
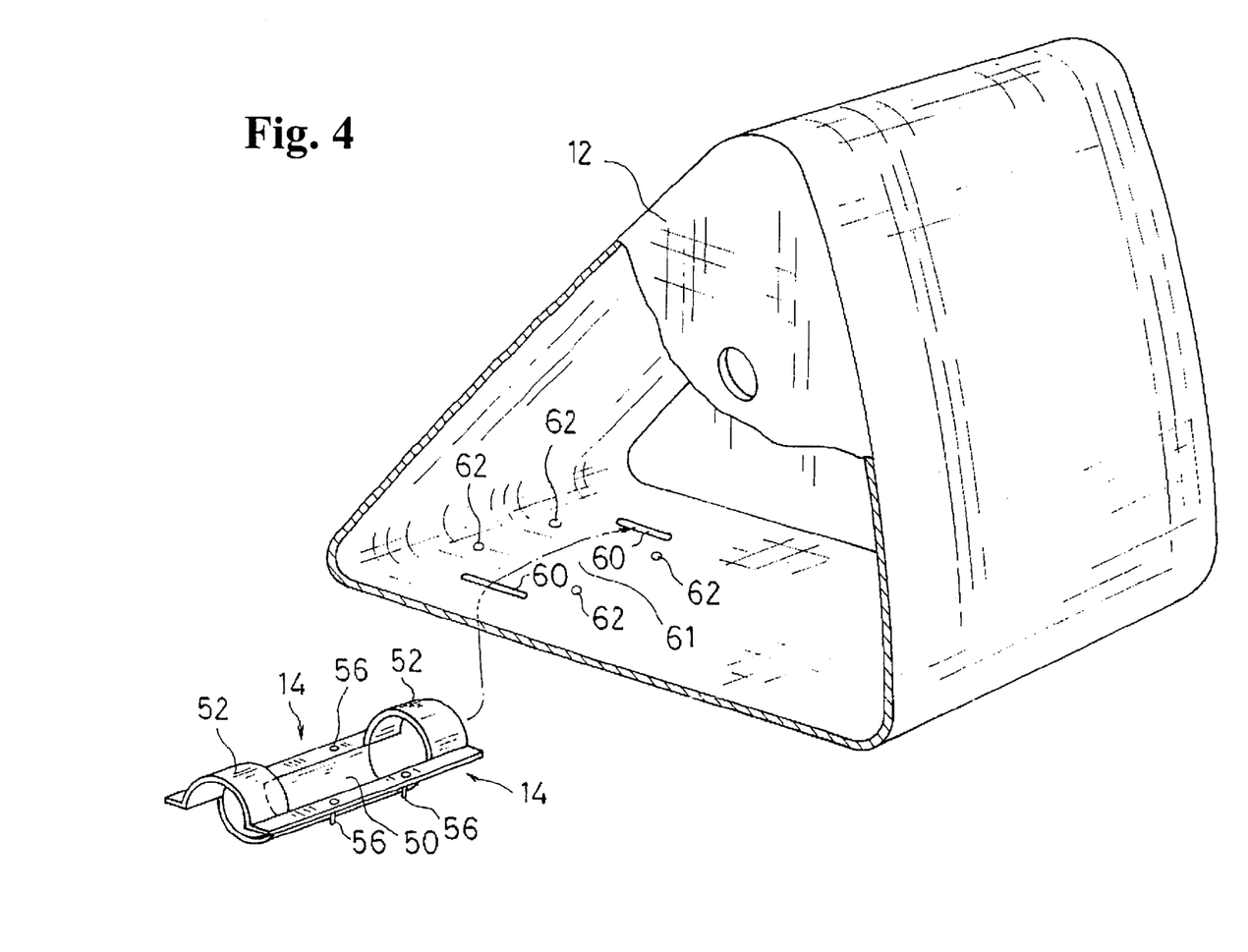
FIG. 4 is a perspective view showing the relation between the air bag and a bag-fixing ring.
Figure 5:
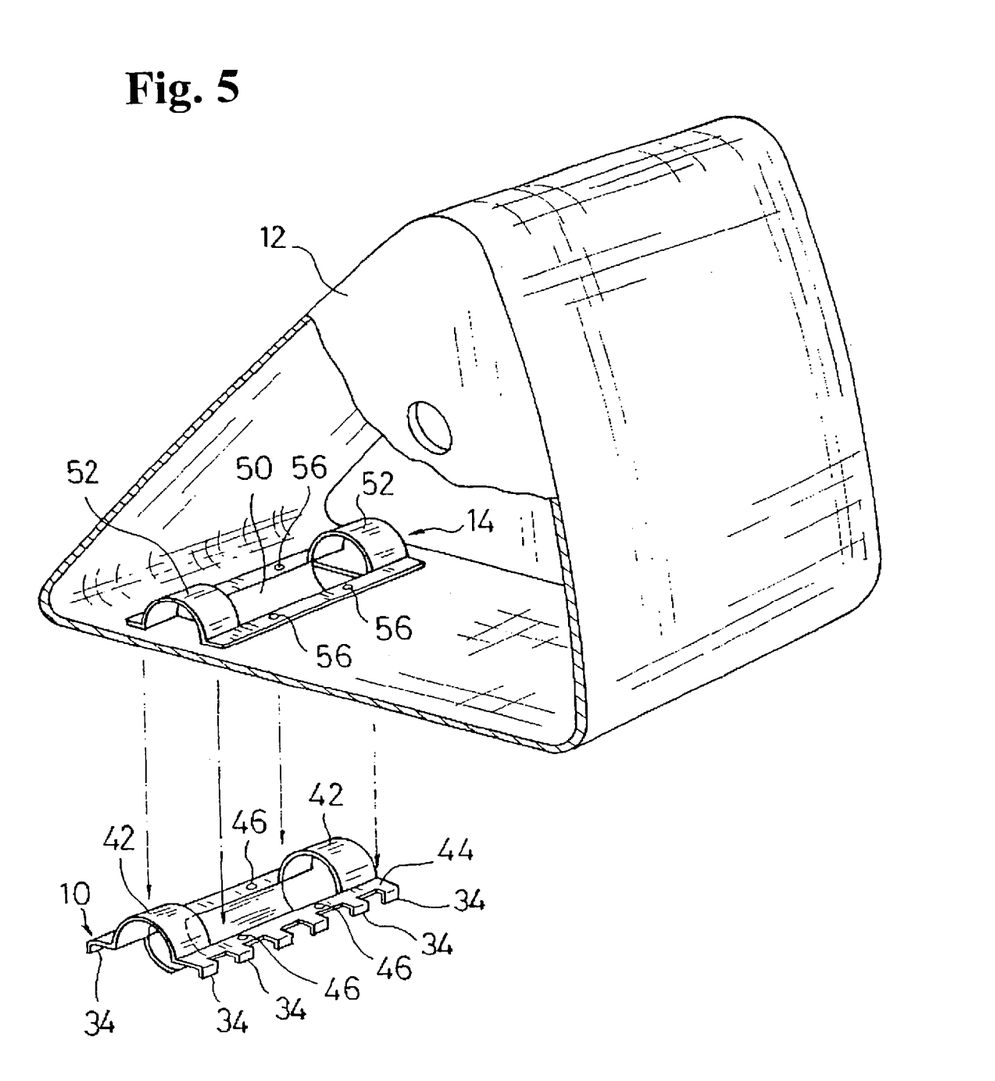
FIG. 5 is a perspective view showing the relation among the air bag, the bag-fixing ring and a base plate.
Figure 6:
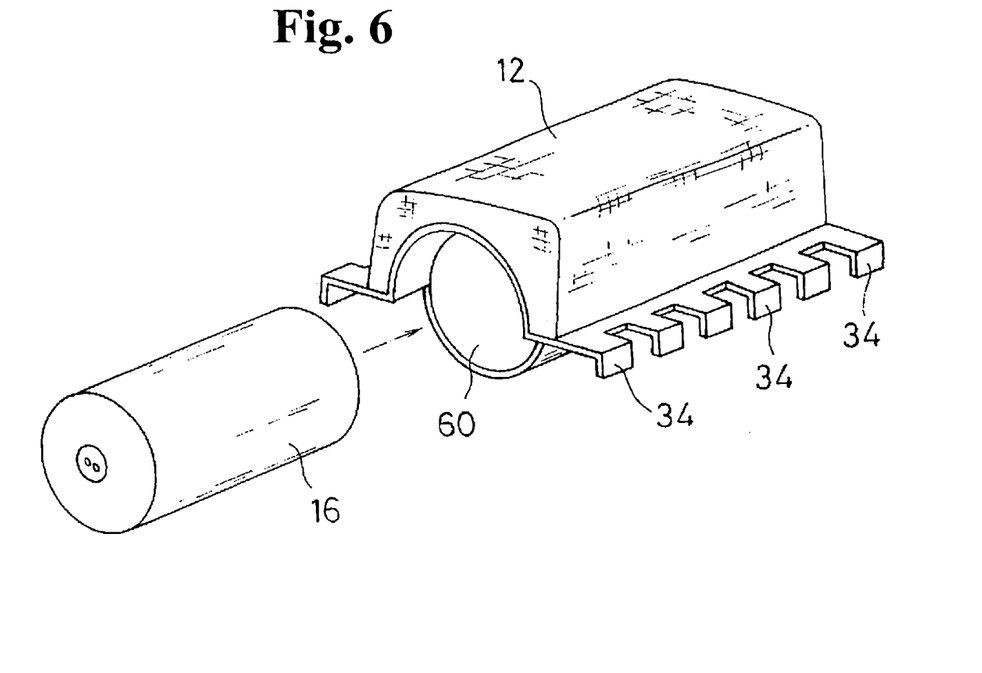
FIG. 6 is a perspective view showing the relation between an inflator and the base plate.
Figure 7:
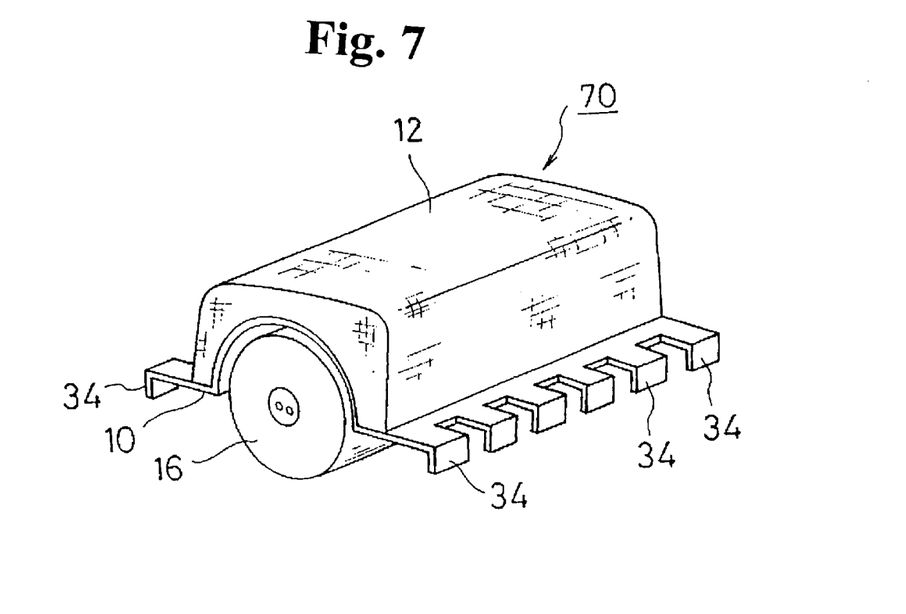
FIG. 7 is a perspective view of an assembly.
Figure 8:
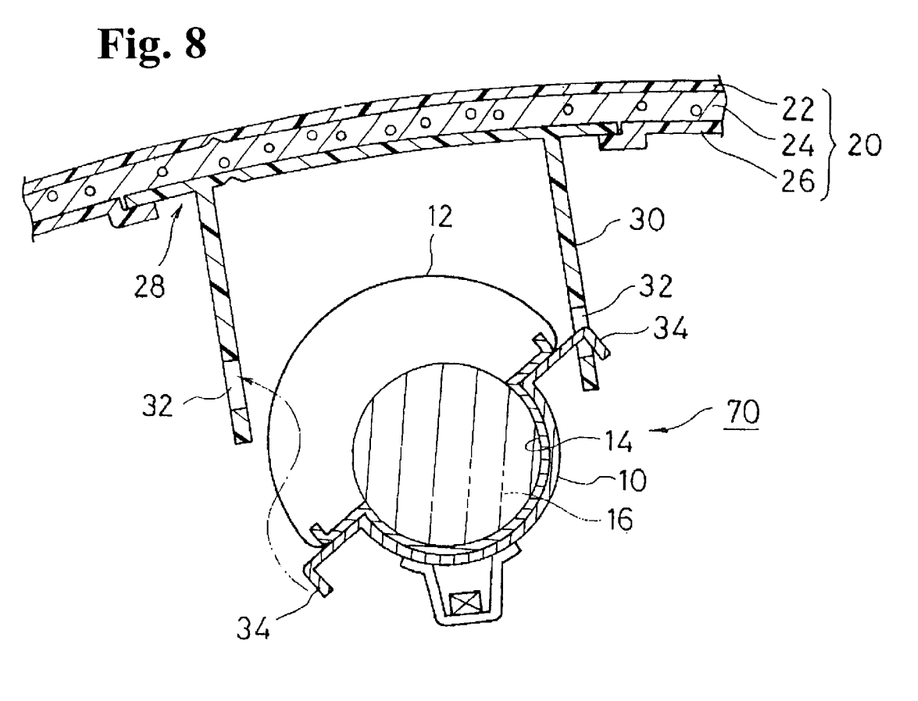
FIG. 8 is a sectional view showing the relation between the assembly and the instrument panel.
Figure 9:
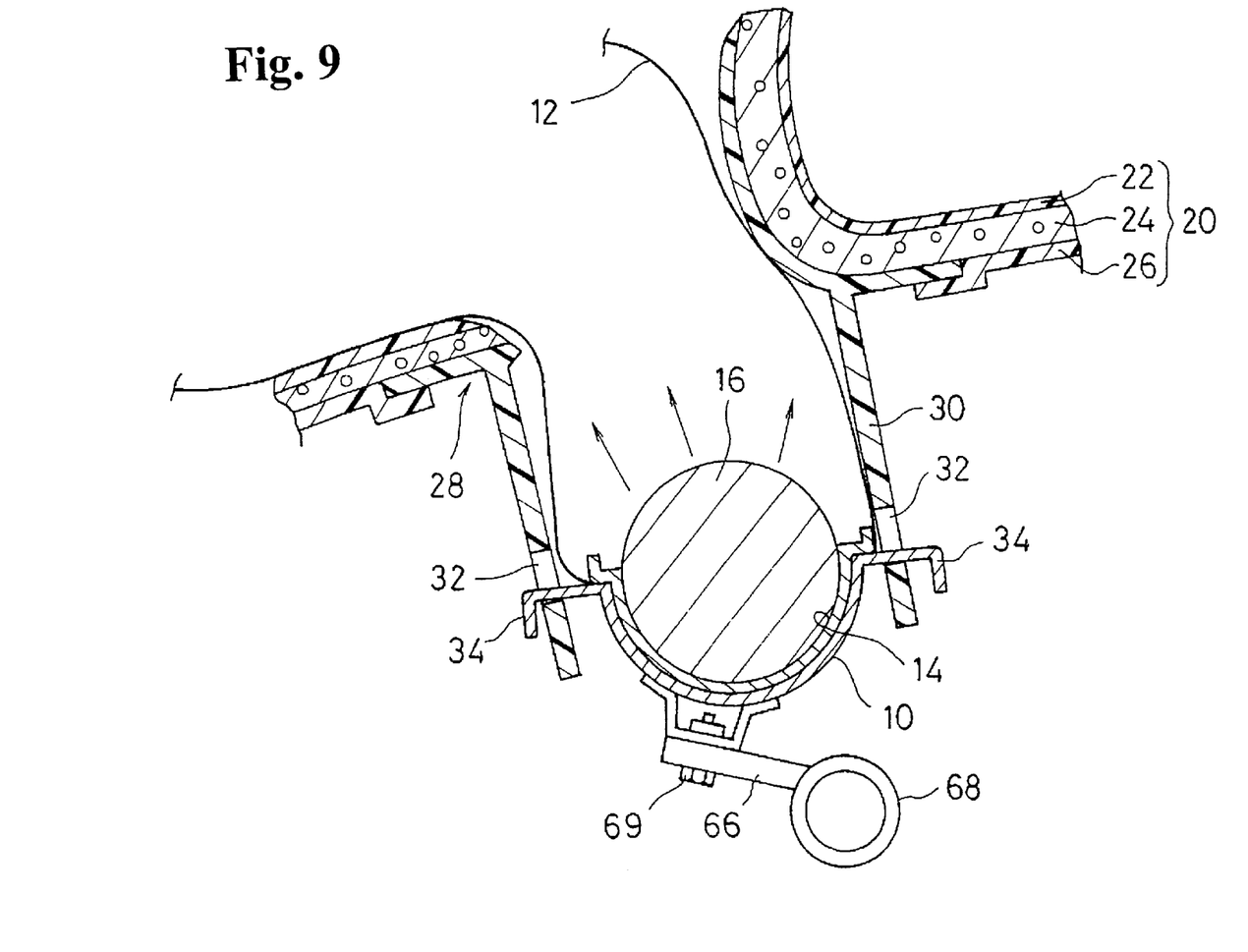
FIG. 9 is a sectional view of the air bag device for the passenger's seat according to the embodiment in the inflated state.

Hereinafter, embodiments of the present invention are described. FIG. 1 is a vertical sectional view of an air bag device according to an embodiment of the present invention, FIG. 2 is a perspective view taken from the back of an instrument panel, FIG. 3 is an exploded perspective view of the air bag device, FIG. 4 and FIG. 5 are perspective views showing the structure of fixing the air bag to a base plate, FIG. 6 is an exploded perspective view showing the relation between the air bag and an inflator, FIG. 7 is a perspective view of an assembly, FIG. 8 is a view for explaining the installation of the assembly, and FIG. 9 is a sectional view of the air bag device for a passenger's seat in operation.

In this air bag device for a passenger's seat, an air bag 12 is fixed to a base plate 10 by a bag-fixing ring 14, and the front of the air bag 12 (upper side in FIG. 1) is covered by an instrument panel 20.

The instrument panel 20 comprises an outer layer 22, a core layer 26, and a foam layer 24 interposed between the outer layer 22 and the core layer 26. The instrument panel 20 includes a resin lid 28 for covering the front of the air bag 12, and the resin lid 28 is integrally formed in the instrument panel by insert molding. The resin lid 28 has a frame portion 30 surrounding the side periphery of the air bag 12. The frame portion 30 is formed with hook holes 32 into which hooks 34 formed on the sides of the base plate 10 are inserted. The instrument panel 20 has tear lines 36 formed therein. The resin lid 28 also has tear lines 38 formed in portions corresponding to the tear lines 36.

Figure 3:
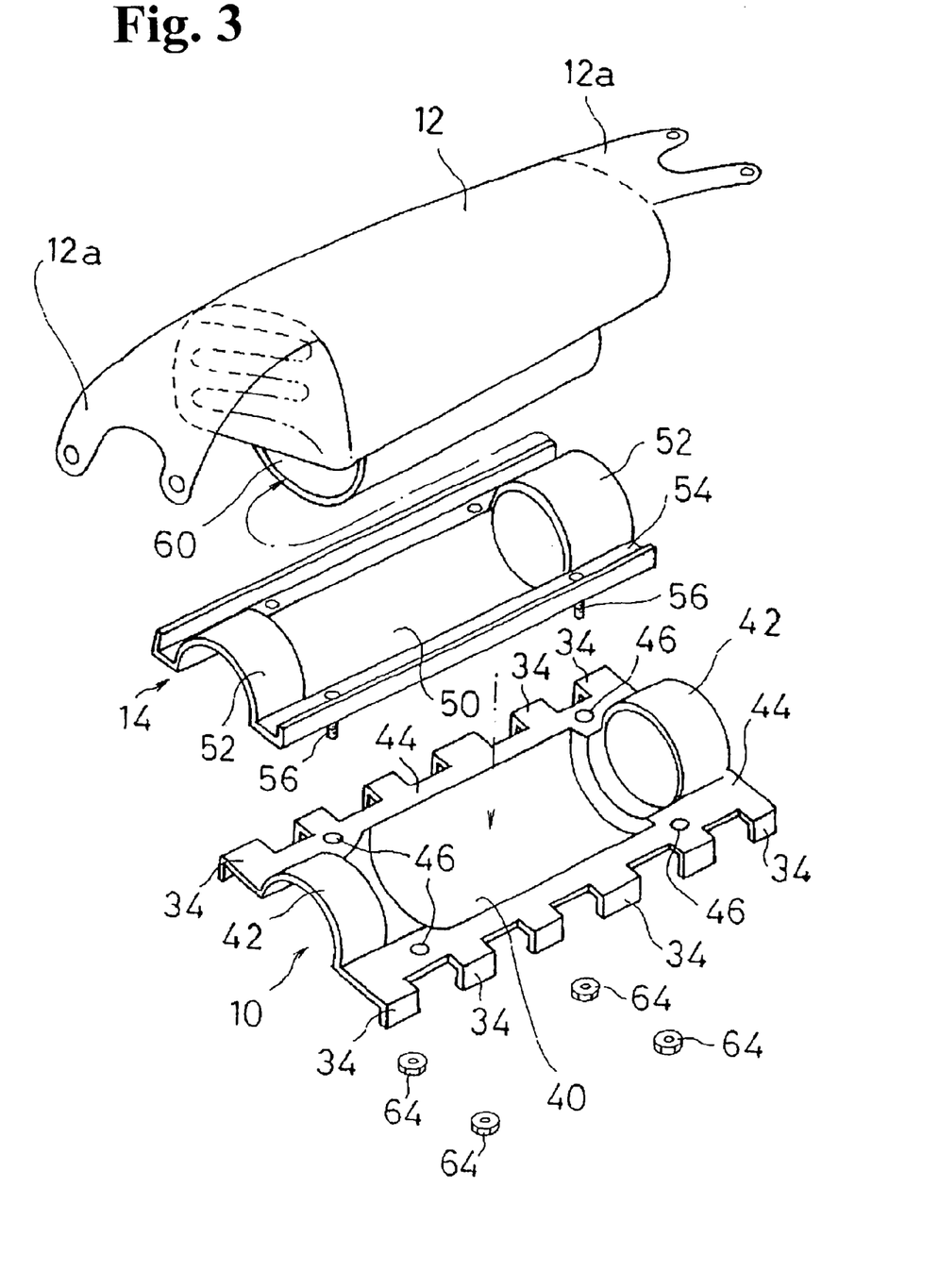
FIG. 3 is an exploded perspective view of the air bag device of the embodiment.

As shown in FIG. 3, the base plate 10 has a downward semi-cylindrical portion 40 formed in a central portion thereof, and upward semi-cylindrical portions 42 on both sides of the downward semi-cylindrical portion 40 in the axial direction. Flanges 44 are disposed on both sides of the base plate 10 to extend along these semi-cylindrical portions 40, 42. A plurality of hooks 34, each being formed in an L-like claw shape, is disposed at intervals along the side of each flange 44. The flanges 44 have bolt-through holes 46 therein.

The bag-fixing ring 14 has a configuration similar to that of the base plate 10, that is, a downward semi-cylindrical portion 50 formed in a central portion thereof, and upward semi-cylindrical portions 52 on both sides of the downward semi-cylindrical portion 50 in the axial direction. Flanges 54 are disposed on both sides of the bag-fixing ring 14 to extend along these semi-cylindrical portions 50, 52. The bag-fixing ring 14 has bolts 56.

As shown in FIG. 4 and FIG. 5, the air bag 12 has a pair of slits 60 therein parallel to each other, and bolt-through holes 62 therein near the slits 60. The bag-fixing ring 14 is inserted into the air bag 12 through one of the slits 60. The bag-fixing ring 14 is disposed in such a manner that the downward semi-cylindrical portion 50 presses an area 61 between the slits 60.

The base plate 10 is disposed to face the air bag 12 in such a manner that the base plate 10 is superposed on the bag-fixing ring 14. As the base plate 10 is disposed to face the bag-fixing ring 14, the bolts 56 are inserted into the bolt-through holes 46 of the base plate 10 through the bolt-through holes 62. Then, nuts 64 are screwed onto the bolts 56, whereby the air bag 12 is securely clamped between the bag-fixing ring 14 and the base plate 10. In this state, the area 61 between the slits 60 is pressed by the downward semi-cylindrical portion 50 of the bag-fixing ring 14 while the areas outside the slits 60 are pressed by the upward semi-cylindrical portions 42 of the base plate 10, whereby the slits 60 are shaped to be circular openings as shown in FIG. 6.

By inserting an inflator 16 into one of the slits 60, the air bag 12, the base plate 10, the bag-fixing ring 14 and the inflator 16 are assembled as an assembly 70 as shown in FIG. 7.

As shown in FIG. 8, the hooks 34 on one side of the assembly 70 assembled as shown in FIG. 7 are first engaged with the hook holes 32 on one side of the frame portion 30, and then the other side of the assembly 70 is pushed into the other side of the frame portion 30. Accordingly, the hooks 34 on the other side of the assembly 70 are engaged with the hook holes 32 on the other side of the frame portion 30, so that the assembly 70 is connected to the instrument panel 20. After that, the base plate 10 is fixed to a bracket 66 extending from a vehicle member 68 by bolts 69. In this manner, the installation of the air bag device is completed.

In the air bag device for the passenger's seat installed behind the instrument panel 20 as mentioned above, the inflator 16 spouts gas in the event of a vehicle collision, so that the air bag 12 is inflated as shown in FIG. 9. Because of the inflation of the air bag 12, the instrument panel 20 is broken along the tear lines 36, 38, whereby the air bag 12 is largely inflated into a vehicle cabin.

As apparent from the aforementioned description, the air bag device of the present invention can eliminate a container-like retainer used in the conventional air bag device for a passenger's seat since the frame portion 30 is integrally formed in the instrument panel 20 according to the air bag device for the passenger's seat of this embodiment. Accordingly, regardless of the layout requirements of the space behind the instrument panel 20, the installation of the air bag device can be done just by fitting the assembly 70 composed of the base plate 10, the air bag 12, the bag-fixing ring 14 and the inflator 16 into the frame portion 30.

Figure 10A:
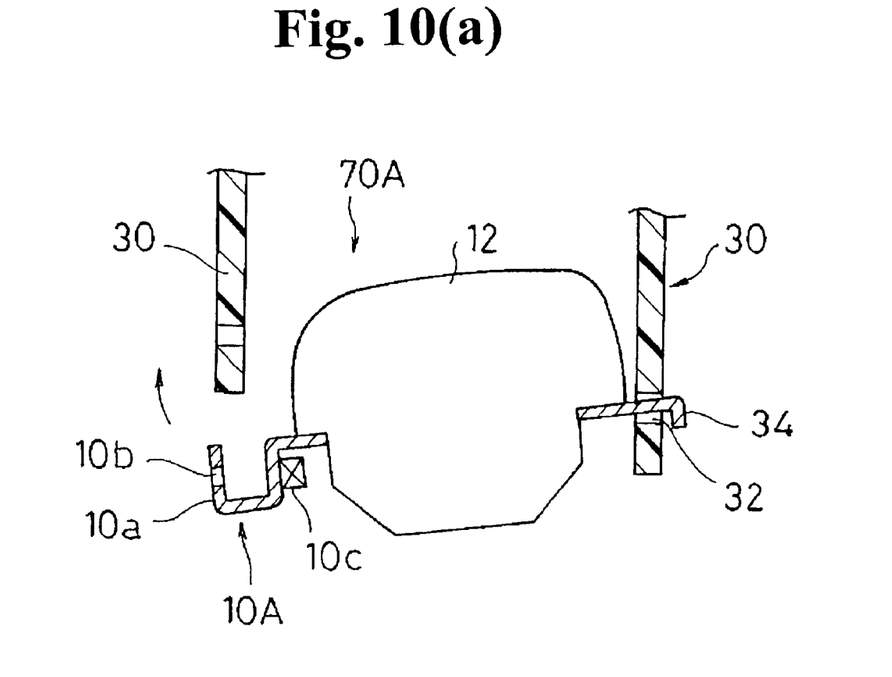
FIG. 10(a) is a sectional view showing a state during an installation of an air bag device according to another embodiment.
Figure 10B:
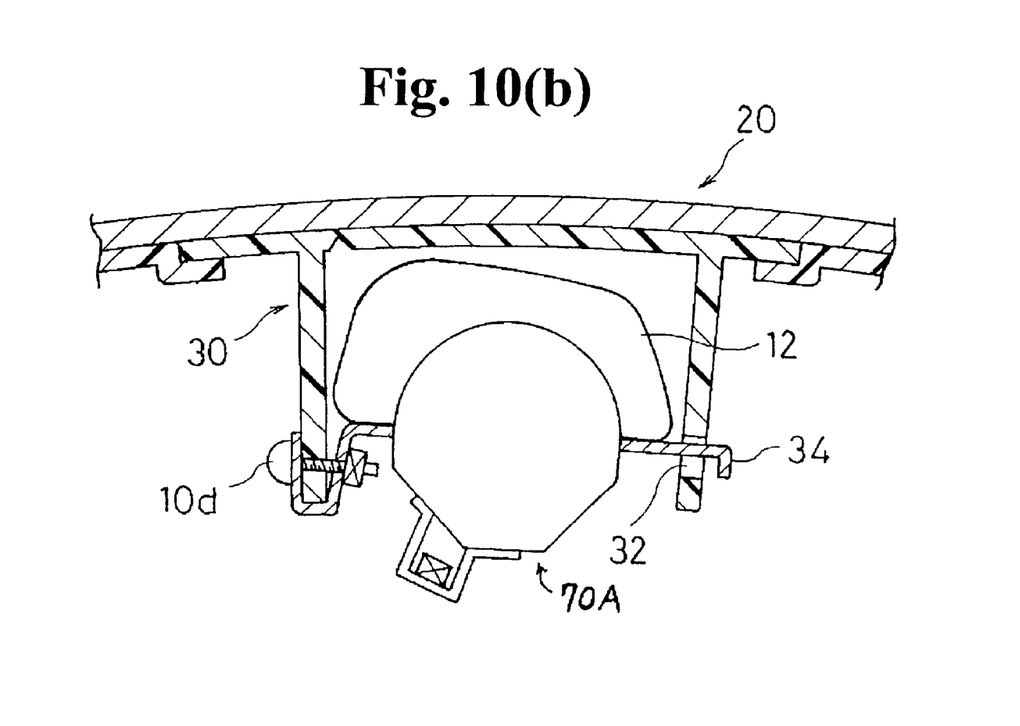
FIG. 10(b) is a sectional view showing a completely installed state.
Figure 11:
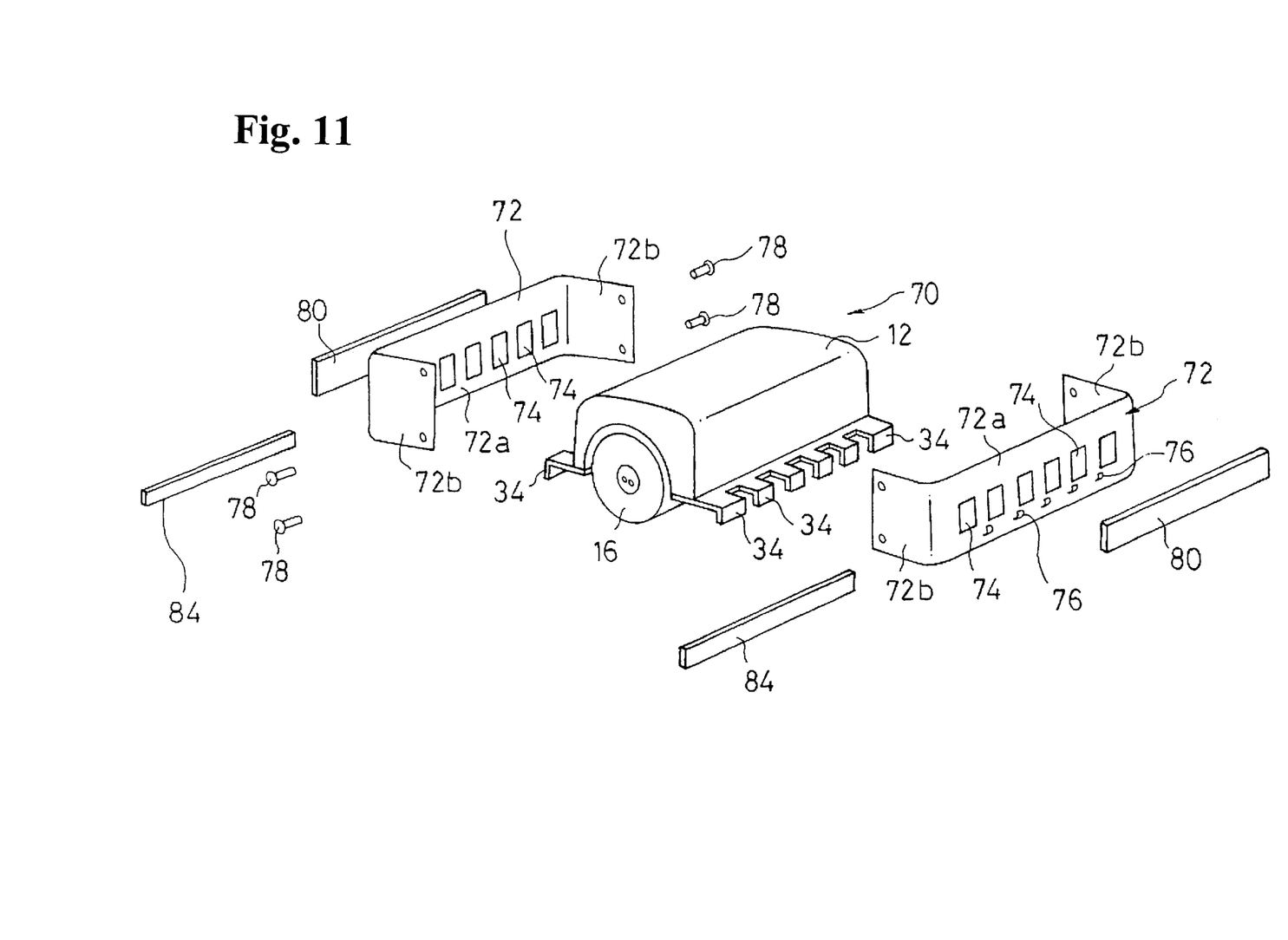
FIG. 11 is an exploded perspective view of an air bag device according to a different embodiment.

In the aforementioned embodiment, the assembly 70 is connected to the frame portion 30 by inserting the hooks 34 on both sides of the base plate 10 into the hook holes 32 of the frame portion 30. The present invention is not limited thereto. The base plate may have a channel-like portion 10a on one side thereof just like a base plate 10A shown in FIGS. 10(a) and 10(b). In this case, after the hooks 34 on the other side are inserted into the hook holes 32, the assembly 70A is pushed up to engage the lower end of the frame portion 30 with the channel-like portion 10a, and then the channel-like portion 10a is fixed to the frame portion 30 by bolts 10d. In FIG. 10(a), a reference numeral 10b designates a bolt-through hole, and a reference numeral 10c designates a nut fixed to the base plate 10A.

According to the present invention, the periphery of the assembly 70 composed of the base plate 10, the bag-fixing ring 14, the air bag 12 and the inflator 16 may be surrounded by a pair of surrounding members. FIG. 11 through FIG. 15 show this embodiment, in which each surrounding member 72 comprises a long side wall 72a to be arranged on the side of the air bag 12 and short side walls 72b projecting from both ends in the longitudinal direction of the long side wall 72a such that a U-shape is formed by the long side wall 72a and the short side walls 72b. The long side wall 72a has a plurality of holes 74 therein for allowing the insertion of the aforementioned hooks 34. The surrounding members 72 are provided with claws 76 formed on the outer surface of the long side walls 72a.

Figure 14:
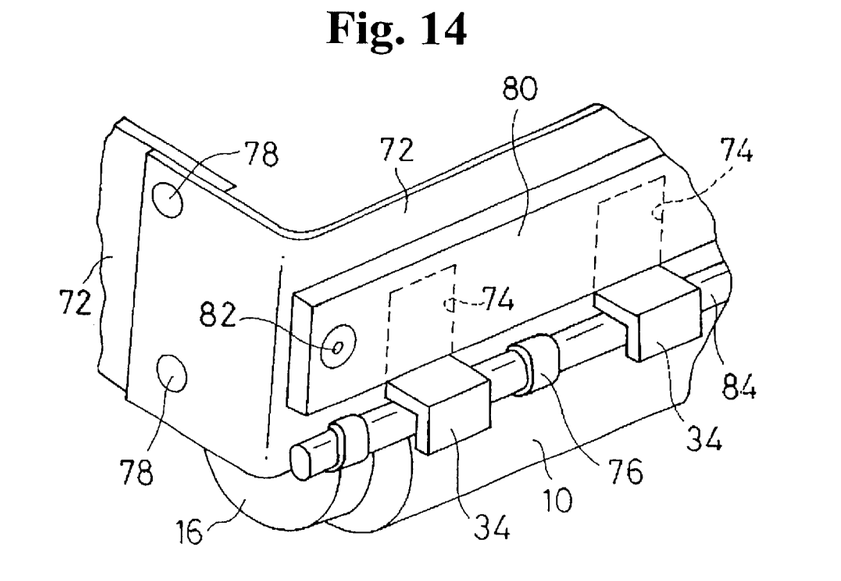
FIG. 14 is a perspective view showing a resin plate and surrounding members.

The surrounding members 72 are arranged on both sides of the assembly 70 in such a manner that the hooks 34 are inserted into the holes 74, the short-side walls 72b of the respective surrounding members 72 are partly superposed on each other, and then the surrounding members 72 are connected at the superposed portions of the short-side walls 72b by rivets 78. After that, resin plates 80 are put on the outer surfaces of the surrounding members 72, and the resin plates 80 are fixed to the surrounding members 72 by rivets 82 as shown in FIG. 14.

Figure 12:
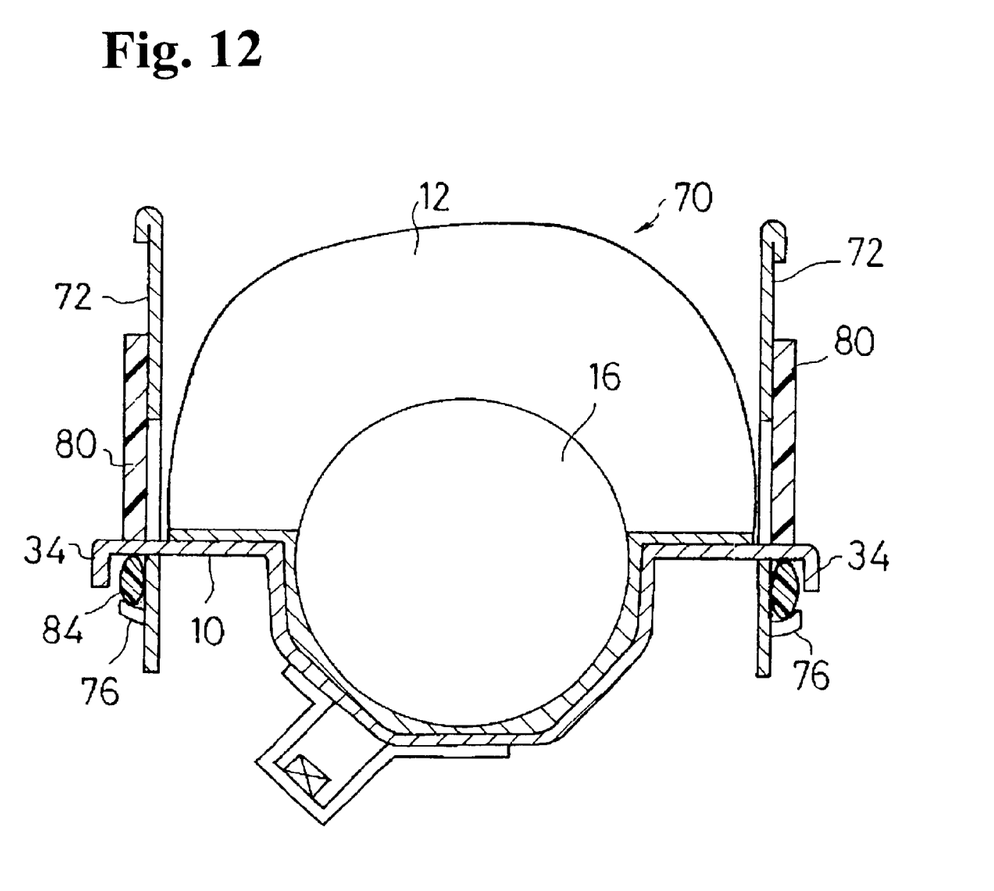
FIG. 12 is a sectional view of the air bag device of FIG. 11.

Resin bars 84 are supported on the surrounding members 72 by the claws 76. The resin bars 84 are arranged to extend along the lower edges of the holes 74. Accordingly, the hooks 34 are sandwiched between the resin bars 84 and the resin plates 80 as shown in FIGS. 12 and 14.

Figure 13:
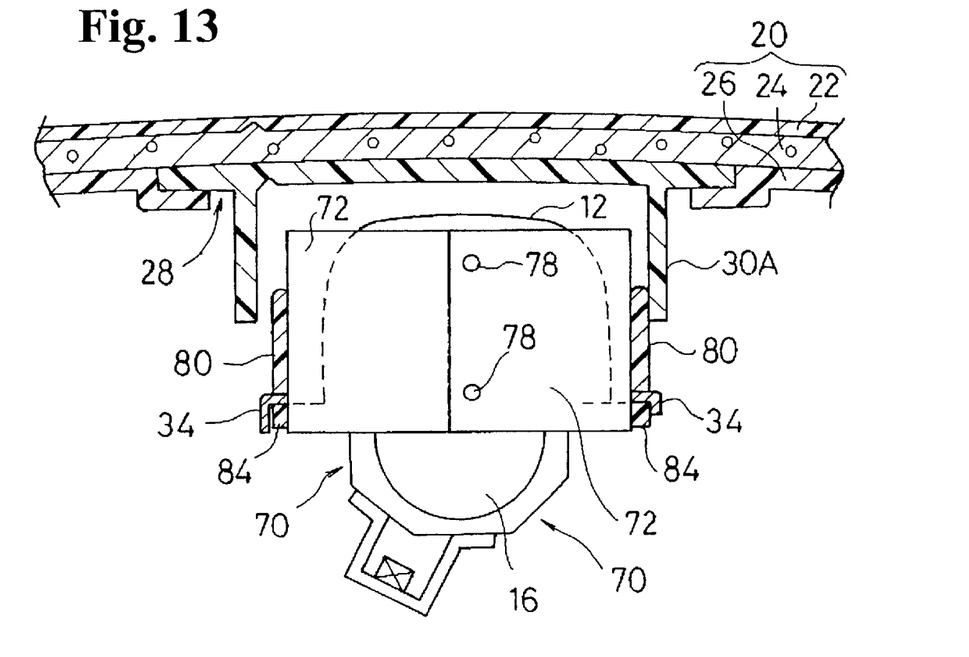
FIG. 13 is a sectional view showing the state in which an assembly shown in FIG. 12 is installed to the instrument panel.

As shown in FIG. 13, the assembly 70 with the surrounding members 72 is disposed in the space behind the instrument panel 20 in the same manner as the aforementioned embodiment, so that the base plate 10 is fixed to the vehicle member 68 (not shown in FIGS. 11 through 15).

In this case, the height in the depth direction of a frame portion 30A behind the instrument panel 20 is lower than that of the aforementioned frame portion 30, so that the frame portion 30A surrounds only the outer surface of an upper half portion of the air bag 12. When the assembly is installed, the upper ends of the surrounding members 72 are slightly inserted into the frame portion 30A.

Figure 15:
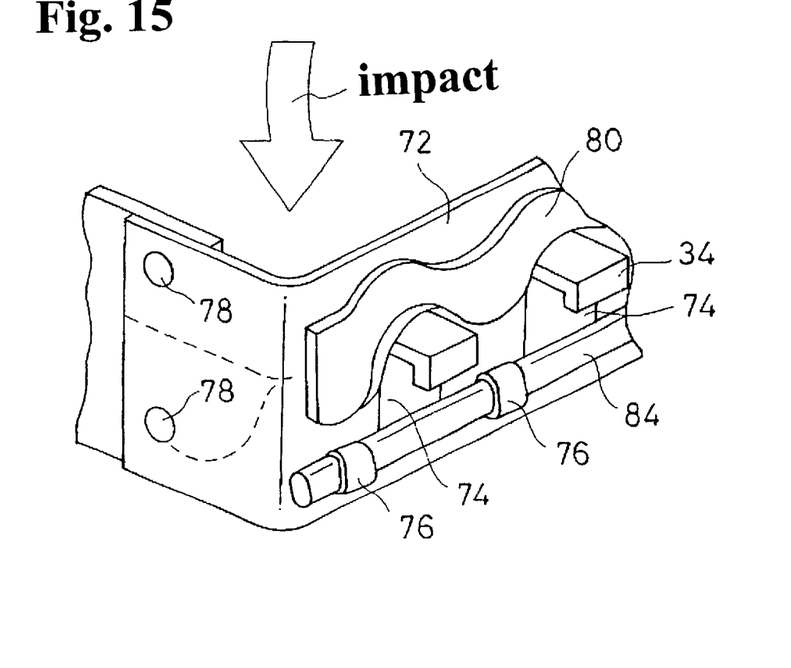
FIG. 15 is a perspective view showing the resin plate and the surrounding members in a state that impact is applied.

When an impact is applied to the instrument panel 20, for example, when the head of an occupant collides with the instrument panel 20, the surrounding members 72 are moved downwardly as shown in FIG. 15. At this point, the resin plates 80 tend to be moved downwardly together with the surrounding members 72. However, since the resin plates 80 contact the hooks 34 of the base plate 10 and the base plate 10 is fixed to the vehicle member so that it is prevented from moving, the resin plates 80 are compressed by the hooks 34, so that the resin plates 80 are plastically deformed, thereby absorbing the impact energy.

Figure 16:
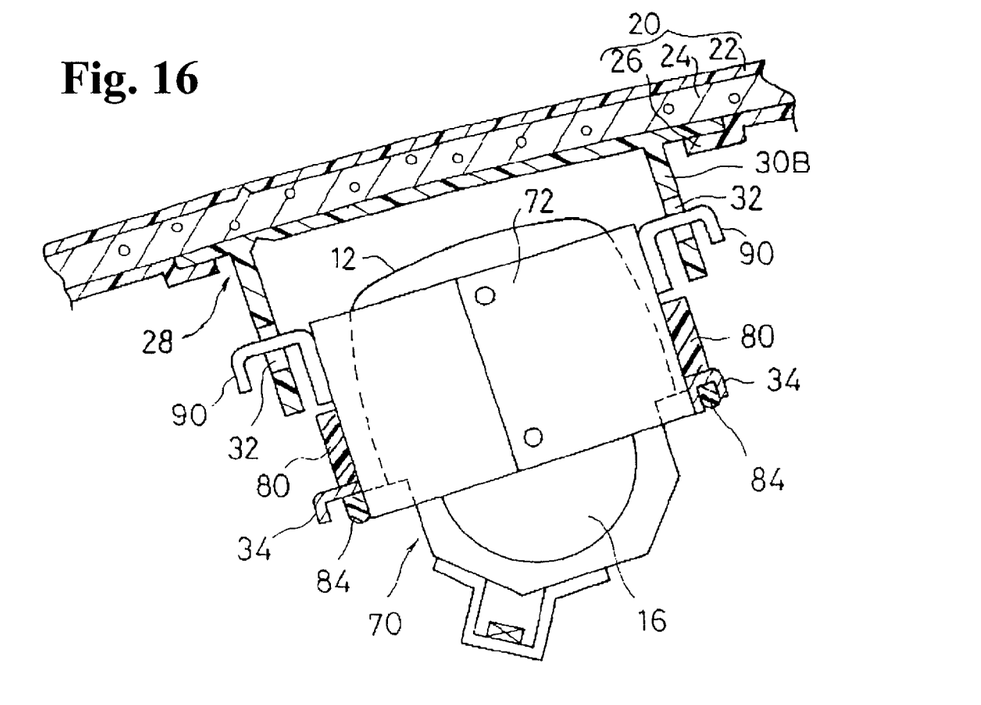
FIG. 16 is a sectional view showing a further different embodiment.
Figure 17:
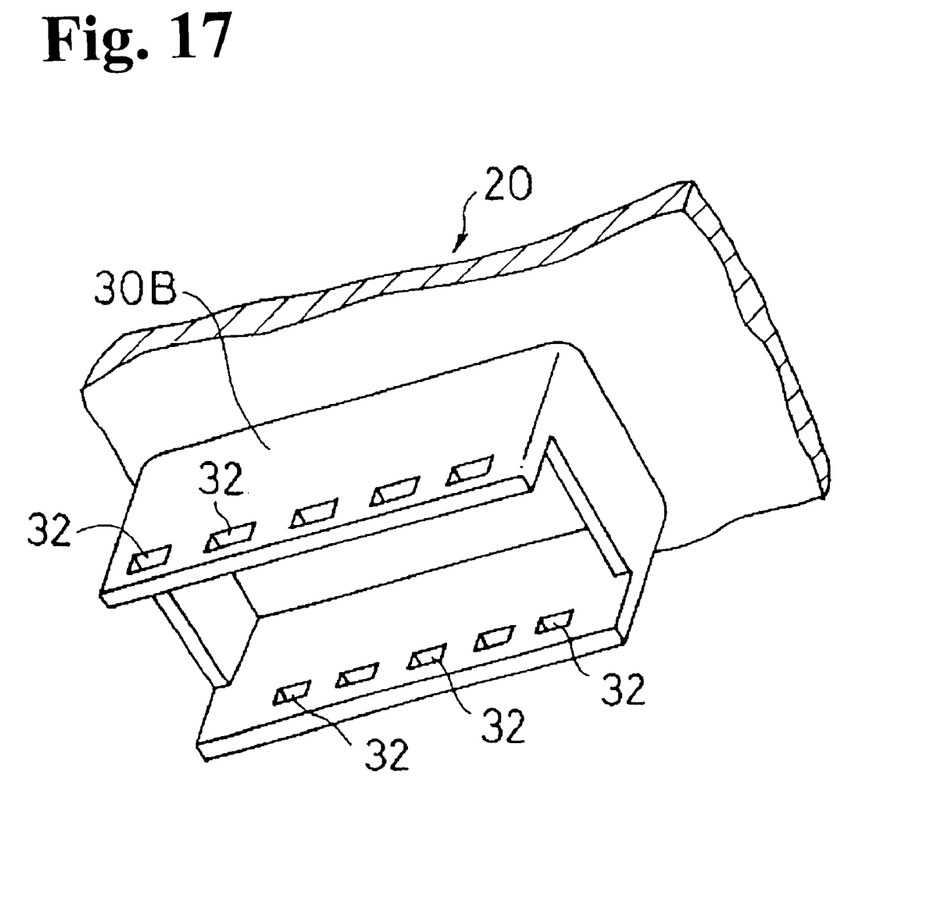
FIG. 17 is a perspective view showing a frame portion shown in FIG. 16 taken from the back of the instrument panel.

Though the surrounding members 72 are just inserted inside the frame portion 30A in the structure shown in FIG. 11 through FIG. 15, the present invention is not limited to this structure. As shown in FIGS. 16 and 17, the surrounding members 72 may have hooks 90, and the frame portion 30A may be a frame portion 30B having holes 32 therein. In this case, the surrounding members 72 are engaged with the frame portion 30B by inserting the hooks 90 into the holes 32. Other components of this embodiment of FIG. 16 are the same as those of the embodiment of FIG. 13, so that the same or similar components are designated by the reference numerals used in FIG. 13.

As described above, the present invention can provide the air bag device, in which components, such as the base plate, can be used in common in various vehicle models with different profiles or configurations of an instrument panel and different layout requirements of the space behind the instrument panel.

According to the present invention, an air bag device, which is light in weight because of less metallic parts as compared to a conventional air bag device, can be provided.

In addition, according to the present invention, an air bag device can be composed to have a function of absorbing impact on the instrument panel.

While the invention has been explained with reference to the specific embodiments of the invention, the explanation is illustrative and the invention is limited only by the appended claims.

What is claimed is:

1. An air bag device for a front seat passenger comprising:
   a folded air bag,
   an inflator for supplying gas to the air bag,
   a base plate fixed to the air bag and including a central portion for receiving the inflator, two flanges extending laterally outwardly from the central portion so that the folded air bag is located above the central portion and the two flanges, hooks formed on at least one of the flanges to extend laterally outwardly therefrom, and first engaging means formed on at least one side of the two flanges, and
   a lid for covering a front of the folded air bag including a frame portion integrally formed with the lid to directly surround the folded air bag and having holes at least on one side thereof to engage the hooks, and second engaging means formed on the other side thereof and engaging the first engaging means so that when the first and second engaging means, and the hooks and holes are respectively engaged together, the folded air bag is disposed on the base plate and surrounded by the frame portion.

2. The air bag device for a front seat passenger according to claim 1, further comprising a bag-fixing ring disposed inside the folded air bag and fixed to the base plate so that a part of the air bag is sandwiched between the bag-fixing ring and the base plate and the inflator is located inside the folded air bag.

3. The air bag device for a front seat passenger according to claim 2, wherein said central portion has a downward semi-cylindrical portion for receiving the inflator therein, said flanges extending laterally outwardly from edges of the downward semi-cylindrical portion.

4. The air bag device for a front seat passenger according to claim 3, wherein said central portion further includes upward semi-cylindrical portions on two longitudinal ends of the downward semi-cylindrical portion.

5. The air bag device for a front seat passenger according to claim 4, wherein said bag-fixing ring includes a downward semi-cylindrical portion and upward semi-cylindrical portions on two longitudinal ends of the downward semi-cylindrical portion, said upward and downward semi-cylindrical portions of the base plate and the fixing ring being piled together with a part of the air bag sandwich therebetween.

6. The air bag device for a front seat passenger according to claim 2, wherein said first engaging means is a plurality of hooks extending laterally outwardly from the flange of the base plate, and said second engaging means is a plurality of holes formed in a part of the frame portion of the lid to engage the hooks forming the first engaging means.

7. The air bag device for a front seat passenger according to claim 6, wherein said lid is a part of an instrument panel of a vehicle.

8. An air bag device for a front seat passenger comprising:
   a folded air bag,
   an inflator for supplying gas to the air bag,
   a base plate fixed to the air bag and including a central portion having a downward semi-cylindrical portion for receiving the inflator therein, two flanges extending laterally outwardly from edges of the downward semi-cylindrical portion so that the folded air bag is located above the central portion and the two flanges, and hooks extending laterally outwardly from the flanges adapted to engage holes formed in a frame portion of a lid, and
   a bag-fixing ring disposed inside the folded air bag and fixed to the base plate so that a part of the air bag is sandwiched between the bag-fixing ring and the base plate and the inflator is located inside the folded air bag.

9. The air bag device for a front seat passenger according to claim 8, wherein said central portion further includes upward semi-cylindrical portions on two longitudinal ends of the downward semi-cylindrical portion, and said bag-fixing ring includes a downward semi-cylindrical portion and upward semi-cylindrical portions on two longitudinal ends of the downward semi-cylindrical portion, said upward and downward semi-cylindrical portions of the base plate and the fixing ring being piled together with a part of the air bag sandwiched therebetween.

* * * * *